ing connecting rod pivoted to said crank and of a length ranging from 3 to 5 times the radius of said crank, a driven crank journalled in said frame to turn about a fixed axis, a driven connecting rod pivoted to said driven crank, a pivot movably mounted in said frame so that its distance from the axes of said driving and driven cranks varies according to its position, the mean value of the distance from the axis of the driving crank ranging from 3.5 to 5 times the radius of said driving crank, a lever oscillatable about said pivot and pivotally connected to said connecting rods, at respective points of said lever located at distances from the pivot thereof ranging from 1.7 to 2.5 times the length of the radius of said driving crank, the radius of said driven crank ranging from 1.3 to 1.9 times the radius of the driving crank, the path of displacement of said pivot with respect to the axes of said driving and driven cranks being such that the curves of homokineity corresponding to the various positions of said pivot with respect to said frame all pass through the axis of revolution of said driven crank.

3. A change speed gear box according to claim 1 in which the connecting lever is constituted by a bell crank lever on which the driving connecting rod and the driven connecting rod are pivoted about different respective axes.

4. A change speed device according to claim 1 in which the connecting lever is constituted by a bell crank lever on which the driving connecting rod and the driven connecting rod are pivoted about axes located in planes passing through the axis of said pivot and making with each other an angle of 60°.

5. A change speed device of the continuously variable transmission type, which comprises, in combination, a frame, eccentric driving means journalled in said frame to turn about a fixed axis, a driving connecting rod pivoted to said driving means, a driven eccentric means journalled in said frame to turn about a fixed axis, a driven connecting rod pivoted to said driven means, a pivot movably mounted in said frame to move in a circular path so that its distance from the axis of said driving and driven means varies according to its position, a lever oscillatable about said pivot and interconnecting said connecting rods, the path of displacement of said pivot with respect to the axes of said driving and driven means being such that the curves of homokineity corresponding to the various positions of said pivot with respect to said first axis all pass through the axis of revolution of said driven eccentric means, a driven shaft journalled to turn about a fixed axis, and one-way coupling means between said driven eccentric means and said driven shaft.

6. A change speed device according to claim 1 in which said one-way driven crank is so arranged as to be driven during that semi-circular section of the displacement of the driving crank which is cut by a line passing through the axis of the driving crank and the axis of said pivot.

7. A change speed device of the continuously variable transmission type which comprises, in combination, a frame, a driving shaft journalled in said frame to turn about a fixed axis, four driving cranks carried by said shaft at angular intervals of 90°, a driving connecting rod pivoted to each of said cranks, a driven shaft mounted in said frame to turn about a fixed axis, four driven cranks carried by said frame about the axis of said driven shaft, driven connecting rods connected each to one of said driven cranks respectively so as to impart an oscillating motion thereto, a pivot movably mounted in said frame so that its distance from the axis of said driving shaft varies according to its position, four levers oscillatable about said pivot and each interconnecting one of said driving connecting rods with the corresponding driven connecting rod, and free wheel means interposed between each of said driven cranks and said driven shaft, the path of displacement of said pivot with respect to the axes of said driving and driven shafts being such that the curves of homokineity corresponding to the various positions of said pivot with respect to said frame all pass through the axis of revolution of said driven shaft, ensuring homokinetic transmission, for each of the transmission elements constituted by a driving crank, its driving connecting rod, the connecting lever, the corresponding driven connecting rod and its driven crank, over substantially 90° of each revolution of the corresponding driving crank in overlapping phase relation.

8. In combination, an engine including a crankcase, a crankshaft journalled in said crankcase to turn about a fixed axis having at least four cranks at angular intervals of 90°, cylinders carried by said crankcase, pistons in said cylinders, connecting rods for said pistons engaging said cranks, a driving connecting rod pivoted to each of said cranks, a driven shaft mounted in said crankcase to turn about a fixed axis, four driven cranks carried by said frame about the axis of said driven shaft, driven connecting rods connected each to one of said driven cranks respectively so as to impart an oscillating motion thereto, a pivot movably mounted in said crankcase so that its distance from the axis of said crankshaft varies according to its position, four levers oscillatable about said pivot and each interconnecting one of said driving connecting rods with the corresponding driven connecting rods, and free wheel means interposed between each of said driven cranks and said driven shaft, the path of displacement of said pivot with respect to the axes of the crankshaft and driven shaft being such that the curves of homokineity corresponding to the various positions of said pivot with respect to said crankcase all pass through the axis of revolution of said driven shaft, ensuring homokinetic transmission, for each of the transmission elements constituted by a driving crank, its driving connecting rod, the corresponding connecting lever, the corresponding driven connecting rod, and its driven crank, over substantially 90° of each revolution of the corresponding driving crank in overlapping phase relation.

9. In combination, in a vehicle having wheels, an engine including a crankcase, a crankshaft journalled in said crankcase to turn about a fixed axis having at least four cranks at angular intervals of 90°, cylinders carried by said crankcase, pistons in said cylinders, connecting rods for said pistons engaging said cranks, a driving connecting rod pivoted to each of said cranks, a driven shaft mounted in said crankcase to turn about a fixed axis and arranged to drive at least some of said vehicle wheels, four driven cranks carried by said frame about the axis of said driven shaft, driven connecting rods connected each to one of said driven cranks respectively so as to impart an oscillating motion thereto, a pivot movably mounted in said crankcase so that its distance from the axis of said crankshaft varies according to its position, four levers oscillatable about

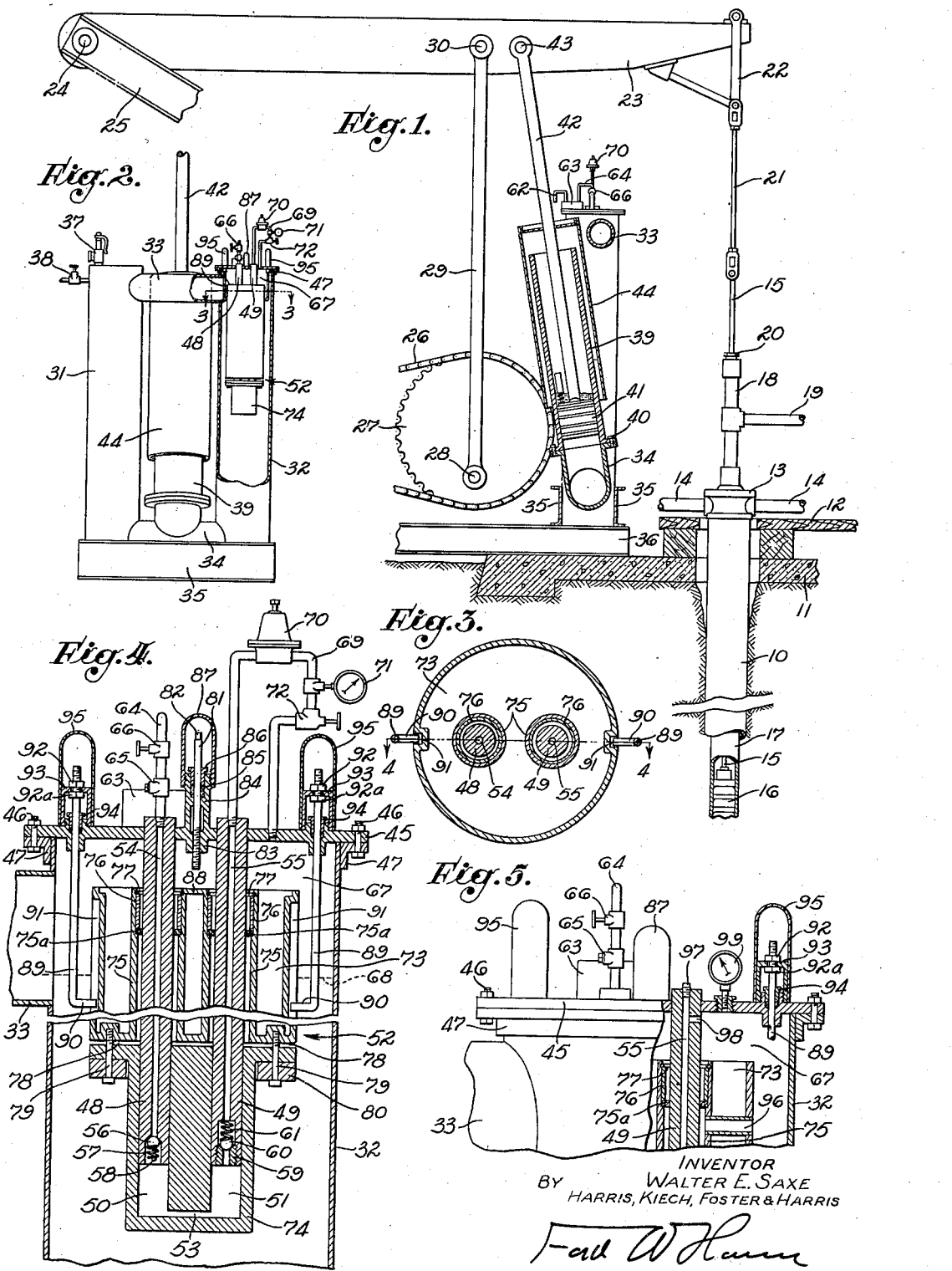
June 13, 1939. W. E. SAXE 2,162,125
FLUID-PRESSURE COUNTERBALANCE
Filed Feb. 15, 1937
INVENTOR
WALTER E. SAXE
BY HARRIS, KIECH, FOSTER & HARRIS
ATTORNEYS.

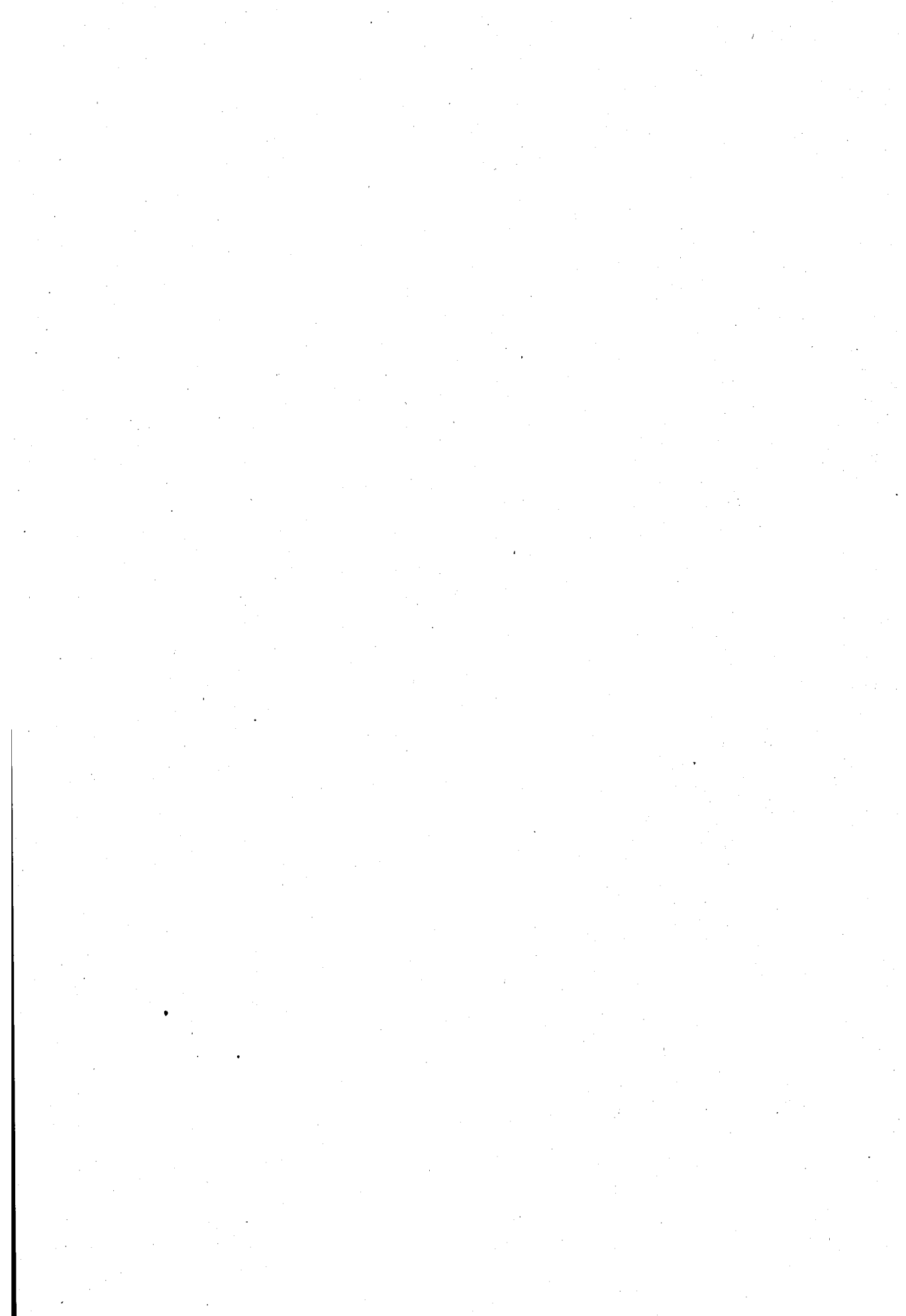

Patented June 13, 1939

2,162,125

UNITED STATES PATENT OFFICE 2,162,125

FLUID-PRESSURE COUNTERBALANCE

Walter E. Saxe, Alhambra, Calif.

Application February 15, 1937, Serial No. 125,684

14 Claims. (Cl. 267—1)

My invention relates to fluid-pressure counterbalancing apparatus, especially apparatus for counterbalancing a reciprocating member, and is directed particularly to an improved form of fluid-pressure counterbalance incorporating automatic means for maintaining the efficiency thereof.

It will be apparent that my invention may be adapted for operation with a wide range of reciprocating members, but it is applicable with exceptional advantages to pumping apparatus for oil wells, and for the purpose of illustration, without any limitation applied, the present disclosure will be confined to the invention as embodied in an oil well pumping apparatus.

The principal reciprocating member of an oil pumping apparatus is usually a walking beam, one end of which is connected through a string of sucker rods with a reciprocating pump that may be a great distance below the surface of the ground. The unbalanced weight of the walking beam and associated mechanism, together with the weight of the sucker rods, is borne at all times by the prime mover that actuates the walking beam, but the weight of the oil column in the well to be overcome by force transmitted through the walking beam is generally substantially greater on the upward movement of the walking beam than on the downward movement. In fact, often the whole oil column moves upward with the upstroke of the pump and is then stationary, exerting substantially no force on the sucker rods during the downstroke of the pump.

The purpose of the counterbalance is to equalize the forces against which the walking beam acts on its two movements so that the prime mover will be required to exert substantially the same force on the upward and downward movements of the walking beam. This equalization is obtained by causing the prime mover to store energy on the downstroke of the pump that is released on the upstroke of the pump, and by virtue of such an arrangement the maximum force required from the prime mover is greatly reduced. In the use of my fluid-pressure counterbalance, the walking beam stores potential energy on the downward stroke of the walking beam by compressing a body of gas, such as air.

Especially, since a counterbalance is merely an accessory or subordinate part of the oil pumping apparatus, it is desirable to minimize the attention required to keep up the operating efficiency of such a counterbalance. It is an object of my invention to provide a self-regulating fluid-pressure counterbalance that will automatically maintain the fluid volumes and pressure required for efficiency. In the means for obtaining this end, I have the further object of making the fluid-pressure counterbalance self-sufficient and to an exceptional extent self-contained. Since the loss of efficiency in a fluid-pressure counterbalance is attributable almost entirely to leakage, I have the further objects of minimizing such leakage and of automatically compensating for any unavoidable leakage.

A type of fluid-pressure counterbalance that I have found exceptionally useful for such installations involves a fluid medium that includes both a gaseous body and a liquid body, the latter being by preference a suitable oil. The gas component of such a fluid is employed for its compressibility, and the oil component serves the several purposes of transmitting pressure to the gaseous body, of simplifying problems of gas leakage, and of providing lubrication for various moving parts of the counterbalance.

In my copending application Serial No. 103,169, filed Sept. 29, 1936, entitled Method and apparatus for counterbalancing oil well pumping apparatus, I disclose a counterbalance apparatus involving both oil and air for the fluid medium, in which apparatus leakage of the oil is met by automatic means for returning the escaped oil, and in which air leakage is balanced by means for introducing air into the apparatus as required. An object of the present invention is to improve upon the invention of my prior application, especially to improve upon the automatic means for keeping up the volume and pressure of the air body in the apparatus.

In my prior disclosure the automatic means for replenishing the air comprises an exposed air pump mechanically connected with the walking beam or other member actuated by the prime mover. In the present invention, one of my objects is to enclose the pump within the fluid system; and other important objects are to actuate the pump by movement of the oil body in the system, and to lubricate the pump automatically from that body. In the preferred form of my invention, as disclosed herebelow, it is my object to actuate the pump by a float supported by the oil body.

In my previous application, identified above, the means for automatically replenishing the air of the fluid system included, besides the pump, an air reservoir, a conventional pressure regulator, and pipe valves for the purpose of maintaining a desired counterbalance pressure. An object of one form of my present invention is to achieve the desired constancy of the counterbalance pressure by a simplified arrangement that avoids the necessity for an air reservoir or for a conventional pressure regulator or for pipe valves between the pump and the air body; and in achieving this object I have the more specific object of providing in free communication with the air body a pump that operates to deliver, as a maximum, the desired counterbalance pressure.

In one form of my invention it is my object to provide a pump that is mechanically limited to a compression ratio corresponding to the required counterbalanced pressure, and it is my further object to provide an accessible mechanical adjustment for the pump to control the compression ratio, preferably by controlling the length of the pump stroke.

In another form of my invention it is my object to provide a float-actuated pump in which the ratio of float displacement to the working area of the pump, independently of the permitted length of the pump stroke, limits the delivery of the pump to the desired counterbalance pressure.

Other objects and advantages of my invention will be apparent in my detailed description to follow, taken with the accompanying drawing, in which:

Fig. 1 is a side elevation partly in section of my invention shown with associated parts of oil well pumping apparatus.

Fig. 2 is a front elevation partly broken away of my fluid-pressure counterbalance.

Fig. 3 is a horizontal section, somewhat enlarged, taken as indicated by the line 3—3 of Fig. 2.

Fig. 4 is a vertical axial section of greater enlargement taken as indicated by the line 4—4 of Fig. 3, and Fig. 5 is an enlarged fragmentary view, partly broken away, showing a modification of the invention.

Fig. 1 shows a well casing 10 extending upward through a concrete floor 11 and a platform 12 to terminate in a casing head 13, the casing head having lateral pipes 14. Actuated by sucker rods 15, a pump 16, which may be a considerable distance below the surface, forces upward an oil column in a tubing 17, the oil from the tubing being delivered through a short vertical pipe 18 and a lateral pipe 19 to a suitable reservoir. The uppermost sucker rod or polish rod, passes through a packing gland 20 at the top of the pipe 18 and is connected by a link 21 and a bridle 22 with a reciprocating member in the form of a walking beam 23. The walking beam is pivotally mounted by a shaft 24 to the oil well frame, a portion of one of the frame members being indicated at 25.

The walking beam 23 is reciprocated by a prime mover (not shown) through the medium of a sprocket chain 26, a sprocket wheel 27, a crank pin 28, and a crank 29, the crank being connected with the walking beam by a suitable pin 30. The pressure chamber of my fluid-pressure counterbalance comprises, in the form shown in the drawing, two vertical tanks 31 and 32 connected by an upper horizontal tube 33 and a lower, flanged, T-shaped tube 34, the assemblage being supported between two beams 35 resting on sills 36. This pressure chamber encloses a body of liquid, preferably a suitable oil, and a compressed gaseous body, which may be simply compressed air, and is provided with a suitable safety valve 37 and bleeder cock 38.

My invention includes means operatively connected with the walking beam 23 and adapted to act against the pressure of the liquid body, whereby the liquid body will be forced against the compressed gaseous body to cause the gaseous body to contract and expand with movements of the walking beam. This means may include a cylinder 39 which is mounted to the flanged T-shaped tube 34 by suitable bolts 40. A suitable piston 41 adapted to reciprocate in the cylinder 39 is connected by a ball-and-socket joint to a piston rod 42, the rod being in turn pivotally connected to the walking beam 23 by a suitable pin 43. Preferably the piston rod 42 will carry an overhanging cylindrical guard 44 to protect the open upper end of the cylinder 39, the guard being of sufficient diameter to provide the required clearance for oscillations of the piston rod. It is contemplated that this piston may have incorporated therein pumping means for returning to the cylinder 39 oil that escapes past the piston from the pressure chamber below, and it will be understood without further description that the piston may be constructed in accordance with the corresponding piston disclosed in my copending application cited above.

With each reciprocation of the walking beam the oil level in the pressure chamber rises and falls as the air body contracts and expands. The volume of the air body relative to the displacement of oil occasioned by a stroke of the piston 41 may be large to minimize the variation in the counterbalance pressure, or, if desired, may be small to result in a rapid rise of the counterbalance pressure as the walking beam moves downward. It may be further observed that the shape and dimensions of the two vertical tanks 31 and 32 will determine the height to which the oil body will be moved in those tanks by reciprocations of the piston 41—the smaller the cross-sectional areas of the two tanks the greater the range of reciprocation of the oil body within the vertical tanks.

A feature of my present invention is characterized by the conception of maintaining the pressure of the air body in the pressure tank through the medium of a pump automatically actuated by reciprocations of the oil body. For illustration I have selected an arrangement involving a float supported by the oil body and operatively connected to an air pump that introduces air from the exterior of the compression chamber to replenish the compressed air body as required. Any suitable pump may fall within my conception but I prefer, for the sake of certain advantages, a pump having two plungers cooperative with two corresponding working cylinders. Either the cylinders or the plungers may be stationary.

In the drawing, the tank 32 is provided with a suitable head 45 removably secured by bolts 46 to an angle-iron ring 47 at the upper end of the tank. Mounted in, and preferably extending through the head 45 is a pair of fixed pump plungers 48 and 49 that extend into corresponding working cylinders 50 and 51 in a float that is generally designated by the numeral 52, the two working cylinders being interconnected by a lower horizontal passage 53. Valve controlled intake and discharge passages may be provided in any manner, but I prefer to form an intake passage 54 in the plunger 48 and a discharge passage 55 in the plunger 49. The intake passage 54 is enlarged at its lower end to provide a suitable seat for an intake valve member in the form of a ball 56, the ball being normally held in seated position by virtue of a valve spring 57 acting between the ball and a suitable pin 58. The discharge passage 55 is enlarged at its lower end to receive by threaded engagement a suitable bushing 59 that provides a seat for a discharge valve member in the form of a ball 60, the ball being normally held in seated position by compression of a valve spring 61. The intake passage 54 may draw air direct from the atmosphere, but I prefer to dry the air and for that purpose the air may be drawn through an intake pipe 62 (Fig. 1), a drier 63 containing hygroscopic material, and a pipe 64 leading to the intake passage 54. The pipe 64 may be provided with a check valve 65 and a shutoff valve 66.

The discharge passage 55 communicates with a space 67 occupied by the compressed air above the level 68 of the oil body. In the form of my invention shown in Fig. 4, this communication is through a pipe 69 exterior of the tank, there being a pressure regulator 70 in the pipe, a pressure gauge 71 between the pressure regulator and the discharge end of the pipe, and a cutoff valve 72 between the pressure gauge and the discharge end of the pipe.

The float 52 comprises an upper hollow member 73 and a lower extension 74. The hollow member 73, provided to give buoyancy, has two vertical tubular portions 75 extending through the bottom thereof to receive the plungers 48 and 49. Each tubular portion 75 may be provided with a suitable washer or packing ring 75a embracing the corresponding plunger, the packing ring being secured by a suitable sleeve 76, the sleeve in turn being secured by a split-ring keeper 77 in a well known manner. The packing ring or washer may be omitted. I prefer if the ring or washer is omitted to employ guide means in its place, which may loosely surround the tubular section. The working cylinders proper 50 and 51 are formed in the lower extension 74 of the float, and the plungers are ground for close fit with these cylinders to provide efficient pumping action.

I contemplate providing automatic lubrication for the pump, and for this reason have arranged lateral passages 78 extending from the oil body to each of the plungers 48 and 49 at points sufficiently above the lower ends of the plungers to prevent any significant amount of oil escaping into the working cylinders 50 and 51. It is not necessary to make special bores for this purpose, since lubricating passages 78 may be provided by simply making hollow member 73 separate from the float extension 74, and loosely joining the two by suitable bolts at the desired plane of lubrication to form passages 78. By this construction the passages provided extend radially in all directions from the plungers and the whole periphery of each plunger is accessible to the oil body on which the float rests.

The float will have a normal displacement in the oil body sufficient to support its own weight, and this displacement may be varied at will by adding or dropping weights. These weights may conveniently be in the form of rings, such as the ring 80, which may be secured to the float by bolts 79 that also tie the lower extension 74 to the hollow float member 73.

The range of vertical movement of the float may be limited by any suitable means. For example, to limit the upward movement of the float, an adjustable stop may be provided in the form of a rod 81 extending downward through the head 45 into the tank and being formed at its upper end 82 for manipulation by a wrench. The rod 81 is shown as threaded through a boss 83 and surrounded by a tubular extension 84 containing packing 85 secured by a suitable gland 86. Preferably the protruding upper end of the rod 81 will be protected by a suitable hood 87 removably threaded to the tubular extension 84. The lower end of the rod 81 extends into the path of a stop plate 88 disposed across the top of the float. The downward movement of the float may be limited by a pair of rods 89, each rod being bent at its lower end to provide a horizontal finger 90 that engages a complementary vertical slot 91 the slots being in opposite sides of the float. These rods may be adjusted to engage the upper ends of the slots, thereby holding the float in suspension, as the oil level drops to its lowest limit of reciprocation. To provide for such adjustment the upper end of each rod is threaded to receive an adjustment nut 92 that rests upon a suitable yoke 93 and a similar nut 92a under the yoke. Below this yoke an unthreaded portion of the rod extends through suitable packing gland 94. Preferably the protruding upper end of the rod is protected by a suitable removable cover 95.

The float 52 follows the reciprocations of the surface level 68 in the oil body, subject to limitations of movement by the stop rod 81 and fingers 90, and subject further to resistance to upward movement arising from compression of air in the working cylinders 50 and 51 of the pump. As the float moves downward from its uppermost position, pressure in the working cylinders 50 and 51 falls below atmospheric pressure and the intake valve 56 opens to admit air. On the upward movement of the float the intake valve 56 closes and air within the two working cylinders is compressed. Whether the discharge valve 60 opens or not will depend upon the pressure in the discharge passage 55, which pressure depends in turn upon the adjustment of the pressure regulator 70 and the pressure of the compressed air body in space 67.

If the pumping means is constructed and arranged to deliver a pressure considerably in excess of the required compensating pressure, the pressure actually delivered to the space 67 may be cut down to the required value by simply adjusting the pressure regulator 70 in a manner well known to the art. My particular arrangement shown in the drawing facilitates close adjustment of the pressure delivered to the space 67, since the pressure delivered by the pressure regulator 70 may be accurately checked by simply closing the valve 72 and reading the gauge 71.

It will be understood that since the pressure delivered by the pumping means depends upon the compression ratio, which in turn varies with the length of the pump stroke, adjustment of the length of the pump movement, i. e., range of reciprocation of the float, offers a second means of adjusting the pressure delivered by the pump, a means of adjustment that may be used in conjunction with the pressure regulator or may be used in the absence of a pressure regulator.

Fig. 5 indicates a simple modification of my invention which is similar in most respects to the construction of Fig. 4, corresponding numbers being used to indicate corresponding parts. The modification differs from the first described form of my invention in providing for lubrication through tubular passages 96 extending radially through hollow members 73 into the tubular portions 75 of the hollow member embracing the plungers 48 and 49, the lubrication passages being accessible to oil surge from the oil body in the pressure chamber. The modification also differs in the elimination of the pipe line 69, including the pressure regulator 70, the pressure gauge 71 and the valve 72. The outer end of the intake passage 55 in this form of my invention is closed by a suitable plug 97, and air discharged from the pump is delivered directly into the space 67 through a lateral bore 98 in the plunger 49. Preferably a pressure gauge 99 will be mounted in the head 45 of the tank. In this embodiment of my invention, compensating pressure as indicated by the gauge 98, may be regulated by adjusting the limits of reciprocation of the float 52, or may be regulated in another manner to be described. The advantage of this construction resides in the elimination of parts and in the elimination of points from which air leakage may occur.

It is apparent that the float with its superimposed weight has a normal displacement balancing the total weight. As the oil level moves upward, the float tends to move correspondingly but is held back by pressure in the working cylinders to whatever extent necessary to provide an increased displacement balancing the pressure in the working cylinders of the pump. This increased displacement, as contrasted with the normal displacement of the float, provides the force that compresses the air and will accordingly be referred to as the "effective" displacement of the float. For example, if the float has a normal displacement of one cubic foot at the bottom of the reciprocation of the liquid level and if the two plungers are each ⅝ inch in diameter, the combined area of the two plungers, or the working area of the pump, will be .6136 inch. When, with a rising oil level, the pump develops a pressure of 160 pounds per square inch, the float will have, in addition to its normal displacement, an effective displacement sufficient to provide an upward pressure of 98 pounds to balance a pressure of 160 pounds over an area of .6136 inch, such effective displacement for oil weighing 57 pounds per cubic foot being approximately 1.72 cubic feet. The float then lags behind the upward movement of the oil level sufficiently to increase its displacement by 1.72 cubic feet. In effect, the pump tends to stall because of the rapidly rising pressure within the working chambers of the pump.

These facts indicate a third method of adjusting the pump for a given delivery pressure, the first method being through the agency of the pressure regulator, and the second method being through the stops for limiting the movement of the float. In this third method of adjustment, attention is given in the design of the apparatus to the ratio between the effective displacement of the float and the working area of the pump with the end in view of having the pump tend to stall at a predetermined maximum pressure within the pump. Once the apparatus is constructed to deliver pressure at approximately the value required, the delivery pressure of the pump may be adjusted by simply adding or subtracting weights to change the normal displacement of the float. It will readily be understood that for a given range of reciprocation of the oil level, the effective displacement of the float and therefore the delivery pressure of the pump at the top of the reciprocation of the oil level will vary inversely as the normal displacement of the pump. In other words, at the highest oil level, the upward pressure from the float effective for pumping action will be cut down by any weight added to the float.

The fluid-pressure counterbalance, in any of the embodiments described, will automatically maintain its efficiency and balancing pressure over a great period of time, the volumes of both the oil body and the air body being kept at original values. The whole device is enclosed and self-sufficient. The moving parts of the pump are continuously and liberally lubricated, so that the pump will last indefinitely. The whole apparatus requires practically no attention on the part of an operator.

For the purpose of disclosure and to illustrate the principles involved in my invention, I have described preferred forms in specific detail but I reserve the right to all changes and modifications that properly come within the scope of my appended claims.

I claim as my invention:

1. In oil well pumping apparatus the combination with a reciprocating member that moves in one direction under a relatively light load and in the opposite direction under a relatively heavy load of a fluid-pressure counterbalance to store energy from said reciprocating member during the lightly loaded movement thereof and to return energy thereto during the relatively heavily loaded movement thereof, said counterbalance comprising: an enclosed liquid body; a stationary enclosed compressed gaseous body over the liquid body; means operatively connected with said reciprocating member to act against the liquid body thereby causing the gaseous body to expand and contract with movements of the reciprocating member; and a pump to replenish losses from the gaseous body, said pump being actuated by movements of the liquid body.

2. In oil well pumping apparatus the combination with a reciprocating member that moves in one direction under a relatively light load and in the opposite direction under a relatively heavy load of a fluid-pressure counterbalance to store energy from said reciprocating member during the lightly loaded movement thereof and to return energy thereto during the relatively heavily loaded movement thereof, said counterbalance comprising: a stationary pressure chamber; a liquid body in the chamber; an air body in the chamber above the liquid body, said air body being under a desired counterbalance pressure; hydraulic means operatively connected with said reciprocating member and adapted to act against said liquid body thereby causing the air body to expand and contract with movements of the reciprocating member; and an air pump operatively responsive to movements of the liquid body against the gaseous body, said pump being adapted to deliver air to said air body at a maximum pressure approximating the desired counterbalance pressure.

3. In oil well pumping apparatus the combination with a reciprocating member that moves in one direction under a relatively light load and in the opposite direction under a relatively heavy load of a fluid-pressure counterbalance to store energy from said reciprocating member during the lightly loaded movement thereof and to return energy thereto during the relatively heavily loaded movement thereof, said counterbalance comprising: a stationary pressure chamber; a liquid body in the chamber; an air body in the chamber above the liquid; means operatively connected with said reciprocating member and adapted to move against said liquid body thereby